United States Patent Office 2,733,261
Patented Jan. 31, 1956

2,733,261

N-ARYL ISOCYANATES OF α-PHENYL ETHYL-PHENOL CARBAMIC ACID ESTER

Nelson V. Seeger, Cuyahoga Falls, and Thomas G. Mastin, Akron, Ohio, assignors, by mesne assignments, to The Goodyear Tire & Rubber Company, a corporation of Ohio No Drawing. Application November 1, 1950, Serial No. 193,515

4 Claims. (Cl. 260—471)

This invention relates to new compositions of matter and to a method for preparing the same. More particularly, it relates to mono (aromatic urethane) substituted organic isocyanates and to methods for their preparation.

The reactivity of the isocyanate radical with compounds containing labile hydrogen is known. In certain chemical reactions where polyisocyanates are employed, the marked reactivity of the compounds results in certain difficulties. For example, this is true where a polyisocyanate is used to cure or cross-link diisocyanate-modified polyesters or polyesteramides such as those described in our co-pending applications Serial No. 170,055, now abandoned, and Serial No. 170,056, now abandoned. According to the present invention, a means is provided for controlling the reactivity of polyisocyanates.

The broad object of this invention is to provide a new class of chemical compounds from polyisocyanates and monohydric phenols. It is a particular object to provide a new class of chemical compounds some of which are useful as delayed-action curing or cross-linking agents for diisocyanate-modified polyesters and polyesteramides. It is another object of this invention to provide as new compositions of matter the mono-adducts of organic polyisocyanates and monohydric phenols. A specific object is to prepare the mono-adducts of polyisocyanates and monohydric phenols in which the reactivity of the polyfunctional character of the polyisocyanate may be controlled.

A convenient method for the preparation of the new compounds to which this invention relates may be represented by the following equation:

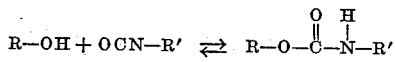

in which R is an aromatic radical and R' is an organic radical which contains at least one —NCO group.

It will be noted that the reaction between the polyisocyanate and the monohydric phenols is a reversible reaction, the direction of which may be controlled by temperature. The mono-adduct of the polyisocyanate and monohydric phenol is formed at relatively low temperatures while the formed mono-adduct dissociates into the polyisocyanate and the phenol at relatively high temperatures in the range of from 100° C. to 150° C. It is this temperature control over the direction of the reaction which makes some mono-adducts particularly useful in controlled chemical reactions, such as their use as cross-linking agents for diisocyanate-modified polyesters and polyesteramides. In the latter case, the mono-adduct does not dissociate into the reactive polyisocyanate until the curing temperatures are reached. Therefore, at normal processing temperatures, the mono-adduct remains stable and minimizes the cross-linking of the linear extended polymer. The mono-adducts are also useful as a means for controlling the tendency of polyisocyanates to self-polymerize since the inactivation of one active —NCO group in the polyisocyanate will retard such polymerization.

In the preparation of the mono-adducts, any polyisocyanate may be used. Representative examples are the aliphatic compounds such as ethylene, trimethylene, tetramethylene, pentamethylene, hexamethylene, propylene-1,2, butylene-1,2, butylene-2,3, butylene-1,3, ethylidine and butylidene diisocyanates; the cycloalkylene compounds such as cyclopentylene-1,3, cyclohexylene-1,4 and cyclohexylene-1,2 diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 2,4-tolylene, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4"-triisocyanto triphenyl methane, 1,3,5-triisocyanato benzene, and 2,4,6-triisocyanato toluene; and the tetraisocyanates such as 4,4'-dimethyl-diphenyl methane 2,2',5,5' tetraisocyanate.

Any monohydric phenol may be used in the formation of the mono-adducts providing the hydroxyl group is the only group containing hydrogen reactive with the —NCO group. Representative examples are phenol, the cresols, the xylenols, the trimethyl phenols, the ethyl phenols, the propyl phenols, the chloro-phenols, the nitro-phenols, the thymols, the carvacrols, mono alpha-phenyl ethyl phenol, di alpha-phenyl ethyl phenol and tri alpha-phenyl ethyl phenol octyl phenol and tertiary butyl phenol.

Certain preferred mono-adducts are those resulting from the reaction of a monohydric phenol, and any one of the following:

1. 4,4'-diphenyl diisocyanate
2. 2,4-tolylene diisocyanate
3. 1,5-naphthalene diisocyanate
4. Hexamethylene diisocyanate Specific mono-adducts which are preferred are those resulting from the reaction of:

1. Mono alpha-phenyl ethyl phenol and 4,4'-diphenyl diisocyanate
2. Mono alpha-phenyl ethyl phenol and 2,4-tolylene diisocyanate
3. Mono alpha-phenyl ethyl phenol and 1,5-naphthalene diisocyanate
4. Mono alpha-phenyl ethyl phenol and hexamethylene diisocyanate In the preparation of the mono-adducts in general, the polyisocyanate and the monohydric phenols are usually dissolved in a suitable inert solvent such as toluene, methyl ethyl ketone, or o-dichlorobenzene. The solutions are stirred together and permitted to stand. The mono-adduct formed separates from the solution and is removed therefrom by filtering or evaporation of the solvent. The time required for the mono-adduct to form will vary from a few minutes to several hours depending upon the particular reactants used. Usually an excess of the polyisocyanate is provided so that the product which separates will be substantially pure mono-adduct. The material removed from solution will probably contain small amounts of the di-adduct and the unreacted material which, if necessary, can be removed by recrystallization or extraction procedures known to those skilled in the art.

The preparation of mono (aromatic urethane) substituted organic isocyanates is illustrated by the following example which is to be interpreted or representative rather than restrictive of the scope of this invention.

*Example*

4,4' diphenyl diisocyanate (23.6 grams or 0.10 mol) and mono alpha-phenyl ethyl phenol (19.83 grams or 0.10 mol) were dissolved in 390 grams of toluene. After standing for several hours, the solution was evaporated to remove the toluene. An oily liquid remained which solidified on standing. The formed mono-adduct showed a melting point of 81–86° C.

While certain representative embodiments and details have been shown for the purpose of illustrating the invention, it will be apparent to those skilled in this art that various changes and modifications may be made therein without departing from the spirit or scope of the invention.

We claim:

1. As new compositions of matter the isocyanates defined by the formula

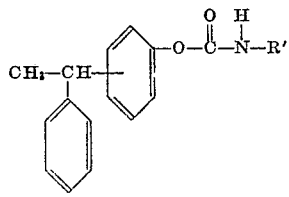

in which R' is an aromatic radical containing at least one isocyanate group.

2. The compositions of matter defined by claim 1 in which R' is

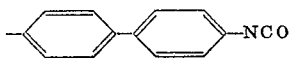

3. The compositions of matter defined by claim 1 in which R' is

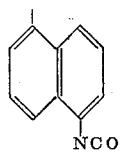

4. The compositions of matter defined by claim 1 in which R' is

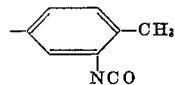

References Cited in the file of this patent

FOREIGN PATENTS

| | | |
|---|---|---|
| 898,088 | France | Apr. 10, 1945 |
| 620,116 | Great Britain | Mar. 21, 1949 |

OTHER REFERENCES

Hoffman: "Berichte," 4, 246–251 (1871).

Meyrick et al.: Trans. Inst. Rubber Industry, pp. 150–151 (October 1949).